(12) United States Patent
Jatschka et al.

(10) Patent No.: US 8,138,898 B2
(45) Date of Patent: Mar. 20, 2012

(54) ELECTRONIC DEVICE TO BE INCORPORATED INTO A MOTOR VEHICLE IN ORDER TO HELP RETRIEVE THE DEVICE FOLLOWING A THEFT

(75) Inventors: Thomas Jatschka, Klein Engersdorf (AT); Alfred Pohl, Mistelbach (AT); Robert Tschofen, Vienna (AT); Gernot Zimmermann, Vienna (AT)

(73) Assignee: Siemens VDO Automotive AG, Regensburg (DE)

( * ) Notice: Subject to any disclaimer, the term of this patent is extended or adjusted under 35 U.S.C. 154(b) by 484 days.

(21) Appl. No.: 11/885,207

(22) PCT Filed: Nov. 24, 2006

(86) PCT No.: PCT/EP2006/068883
§ 371 (c)(1),
(2), (4) Date: Nov. 1, 2007

(87) PCT Pub. No.: WO2007/068566
PCT Pub. Date: Jun. 21, 2007

(65) Prior Publication Data
US 2008/0157941 A1 Jul. 3, 2008

(30) Foreign Application Priority Data
Dec. 14, 2005 (DE) .......................... 10 2005 059 766

(51) Int. Cl.
*B60R 25/10* (2006.01)
(52) U.S. Cl. .............. 340/426.1; 340/426.14; 340/426.2
(58) Field of Classification Search ............... 340/425.5, 340/426.1, 428, 430, 426.12, 426.13, 426.14, 340/426.24, 426.21, 426.3, 426.34, 426.35, 340/426.36, 531, 425
See application file for complete search history.

(56) References Cited

U.S. PATENT DOCUMENTS
4,945,335 A * 7/1990 Kimura et al. ........... 340/426.34
(Continued)

FOREIGN PATENT DOCUMENTS
DE 100 15 031 12/2000
(Continued)

OTHER PUBLICATIONS
PCT Search Report dated Mar. 2, 2007 issued in corresponding application No. PCT/EP2006/068883.

*Primary Examiner* — Daniel Wu
*Assistant Examiner* — Rufus Point
(74) *Attorney, Agent, or Firm* — Cozen O'Connor

(57) ABSTRACT

The invention relates to an electronic device (1) that is to be incorporated into a motor vehicle. Said device (1) comprises a radio module (18) for establishing a short-distance wireless connection to an authorized cellular telephone (2) which is identified based on an identification key for the authorized cellular telephone (2) stored in a memory element (28) of the electronic device (1). In order to make it easier to retrieve the electronic device after the same has been stolen, the electronic device (1) further comprises means for detecting dismounting of the electronic device (1) from a motor vehicle as well as means for automatically establishing a short-distance wireless connection to another cellular telephone and automatically initializing a mobile wireless connection to said other cellular telephone when an identification key for the other cellular telephone is to be or is stored for the first time in the memory element (28) after restarting the electronic device once dismounting has been detected.

16 Claims, 3 Drawing Sheets

U.S. PATENT DOCUMENTS

| | | | | |
|---|---|---|---|---|
| 5,081,667 A * | 1/1992 | Drori et al. | | 455/404.1 |
| 5,370,201 A * | 12/1994 | Inubushi | | 180/287 |
| 5,418,519 A * | 5/1995 | Hino et al. | | 340/426.34 |
| 5,528,248 A * | 6/1996 | Steiner et al. | | 342/357.31 |
| 5,537,673 A * | 7/1996 | Nagashima et al. | | 455/346 |
| 5,801,618 A * | 9/1998 | Jenkins | | 340/426.14 |
| 6,147,598 A * | 11/2000 | Murphy et al. | | 340/426.19 |
| 6,452,483 B2 * | 9/2002 | Chen et al. | | 340/425.5 |
| 6,459,969 B1 * | 10/2002 | Bates et al. | | 701/29 |
| 6,563,421 B1 * | 5/2003 | Wheeler | | 340/539.14 |
| 6,587,040 B2 * | 7/2003 | Seto | | 340/426.1 |
| 6,600,430 B2 * | 7/2003 | Minagawa et al. | | 340/988 |
| 6,701,161 B1 * | 3/2004 | Wendling | | 455/556.1 |
| 6,766,233 B2 * | 7/2004 | Odinak et al. | | 701/36 |
| 6,785,531 B2 * | 8/2004 | Lepley et al. | | 455/351 |
| 6,871,060 B1 * | 3/2005 | Strohmeier | | 455/345 |
| 6,885,289 B1 * | 4/2005 | Nakai | | 340/426.1 |
| 6,956,467 B1 * | 10/2005 | Mercado, Jr. | | 340/426.2 |
| 7,006,845 B2 * | 2/2006 | Simon | | 455/553.1 |
| 7,173,517 B2 * | 2/2007 | Kondo et al. | | 340/5.72 |
| 7,315,236 B2 * | 1/2008 | Yanagida et al. | | 340/425.5 |
| 7,355,506 B2 * | 4/2008 | Chandley | | 340/5.31 |
| 7,437,183 B2 * | 10/2008 | Makinen | | 455/569.1 |
| 7,518,489 B2 * | 4/2009 | Nelson et al. | | 340/426.11 |
| 7,550,869 B2 * | 6/2009 | Higuchi et al. | | 307/10.5 |
| 2002/0163418 A1 * | 11/2002 | Nemoto | | 340/5.2 |
| 2003/0030548 A1 * | 2/2003 | Kovacs et al. | | 340/426 |
| 2003/0227381 A1 | 12/2003 | Best | | |
| 2004/0203601 A1 | 10/2004 | Morriss et al. | | |
| 2005/0143134 A1 | 6/2005 | Harwood et al. | | |
| 2005/0151618 A1 * | 7/2005 | Inagaki et al. | | 340/426.14 |
| 2007/0224941 A1 * | 9/2007 | Yoshioka | | 455/66.1 |

FOREIGN PATENT DOCUMENTS

| | | |
|---|---|---|
| DE | 199 39 631 | 2/2001 |
| DE | 100 28 899 | 1/2002 |
| DE | 203 10 146 | 12/2004 |
| EP | 1 052 834 | 11/2000 |
| GB | 2 397 467 | 7/2004 |
| GB | 2 414 325 | 11/2005 |
| WO | WO 2004/036521 | 4/2004 |

* cited by examiner

ELECTRONIC DEVICE TO BE INCORPORATED INTO A MOTOR VEHICLE IN ORDER TO HELP RETRIEVE THE DEVICE FOLLOWING A THEFT

CROSS REFERENCE TO THE RELATED APPLICATIONS

This is a U.S. national stage of application No. PCT/EP2006/068883, filed on 24 Nov. 2006. Priority is claimed on the following application: DE 10 2005 059 766.1, filed 14 Dec. 2005, the content of which is incorporated herein by reference.

BACKGROUND OF THE INVENTION

1. Field of the Invention

The invention relates to an electronic device for installation in a motor vehicle having a radio module for establishing a short range radio connection to an authorized cell phone, wherein a cell phone is identified by means of an identifier of the authorized cell phone which is stored in a memory element of the electronic device.

2. Description of the Prior Art

EP 1 052 834 discloses an electronic device in the form of a car radio for installation in a motor vehicle which includes a radio module for establishing a short range radio connection with an authorized cell phone. Electronic devices for installation in motor vehicles, such as for example car radios or navigation devices, are in demand and are stolen from motor vehicles relatively frequently. As a protection against theft for car radios it is known that after the voltage supply of the car radio has been interrupted a code first has to be entered. The thief therefore has to acquire the code. This can be done, for example, by corresponding trial and error. Furthermore, it is known to make an operator control of a car radio removable so that when the driver leaves the vehicle he can take the operator control from the vehicle with him. This therefore requires action by the driver. In many cases, the operator control therefore remains in the motor vehicle. These two known methods therefore exhibit only a limited effect. In particular, they merely make re-activating the car radio after a theft more difficult, but do not assist retrieval of the stolen car radio.

SUMMARY OF THE INVENTION

An object of the invention is to provide an electronic device and a method which assists in retrieving the electronic device after a theft.

The object is achieved by an electronic device for installation in a motor vehicle having a radio module for establishing a short range radio connection to an authorized cell phone, wherein the authorized cell phone is identified by means of an identifier of the authorized cell phone which is stored in a memory element of the electronic device. Furthermore, the electronic device has means for detecting removal of the electronic device from a motor vehicle. For this purpose, an electronic connection of the electronic device to a voltage supply system of the motor vehicle can be monitored, wherein interruption of the voltage supply is evaluated as removal of the electronic device. If the means for detecting the removal of the electronic device additionally evaluate the time period between the switching off of the motor vehicle ignition and the interruption of the voltage supply, it is possible to ensure that removal of the electronic device for servicing purposes, for example within two minutes after the ignition of the motor vehicle has been switched off, is not detected as removal due to a theft and the security measures described below do not occur. Alternatively or additionally, removal of the electronic device can also be detected by means of a switch which can be activated mechanically. Such a switch, which is located, for example, on the housing of the electronic device and is closed in the installed state by means of a securing element of the motor vehicle, opens when the device is removed from the motor vehicle and therefore supplies the corresponding information about the removal.

The electronic device according to the invention furthermore has means for automatically establishing a short range radio connection to a further cell phone and for automatically initializing a mobile radio connection to the further cell phone, wherein these measures are taken only if an identifier of the further cell phone is to be stored or has been stored for the first time in the memory element after re-activation of the electronic device after removal has been detected.

In order to prevent an electronic device being able to set up a mobile radio connection to a radio module for establishing a short range radio connection to any cell phone which moves into the range of the radio module, an authorized cell phone must be signed on with the electronic device (so-called pairing). This is done by an identifier of the authorized cell phone being stored in the electronic device. A cell phone which is not signed on with the electronic device cannot be used together with the electronic device. If, after the electronic device has been stolen, an attempt is made to sign on a further cell phone with the electronic device by virtue of the fact that an identifier of the further cell phone is to be stored for the first time in the memory element, a short range radio connection is established automatically to the further cell phone and a mobile radio connection to the further cell phone is initialized. Alternatively or additionally, the same process can also occur if the identifier of the further cell phone has already been stored in the memory element but this storage has taken place after re-activation of the electronic device after removal has been detected. This ensures that whenever the further cell enters the range of the radio module, a corresponding mobile radio connection is set up automatically.

If a telephone number which is dialed when the mobile radio connection is automatically initialized is stored in a memory element of the electronic device, a service center, or else the owner of the electronic device, can be informed about the re-activation of the electronic device. For this purpose, it is possible, for example, to output an SMS or to transmit a predefined voice text. If, in this context, the stored identifier or some other identifier of the further cell phone is transmitted, the possessor of the further cell phone who is now in possession of the electronic device can be determined by means of this identifier. In particular, the telephone number of the further cell phone can be transmitted in this context. Since the owner of the electronic device is known at this point, the corresponding measures for recovering the device can be set in train.

If the memory element of the electronic device is a protected memory element, tampering with the memory element with the aim, for example, of changing the stored telephone number or information stored in the memory element about the detected removal of the electronic device can be prevented. For example, in this respect it may be possible to change said information in the memory element only after a code has been input, a corresponding SIM card has been read or a code CD has been inserted.

If the electronic device has a position determining module and a position of the electronic device which is determined by means of the position determining module is transmitted using the automatically initialized mobile radio connection, the retrieval of the electronic device can be further facilitated.

If the short-range radio connection has a range of not more than 100 m, preferably not more than 10 m, the transmission power can be kept small and the number of cell phones which are in the range of the short range radio connection and for which it is necessary to check whether they are signed on with the electronic device remains manageable.

If the short range radio connection is embodied as a bidirectional short range radio connection, signals can also be transmitted to the electronic device from the cell phone so that the electronic device can also be embodied as a hands free device or can be component of a hands free device.

If the short range radio connection is set up using the Bluetooth method, standardized radio modules can be used. The Bluetooth method has been developed as a short range communications method with ranges of typically 10 m. The transmission power of 1 milliwatt is very low. The 2.4 gigahertz frequency band is provided for the transmission. Bluetooth radio modules are already in use in commercial car radios for implementing a hands free device.

The electronic device can be an information device and/or an entertainment device, in particular a car radio, a navigation system or a multimedia device or a road toll device.

The object is also achieved by a method for operating an antitheft apparatus of an electronic device for a motor vehicle, wherein the electronic device has a radio module for establishing a short range radio connection to an authorized cell phone which is identified by means of an identifier which is stored in the memory element, lift the method having the method steps:
   checking whether the electronic device is activated after removal of the device has been detected and, if this is the case,
   checking whether an identifier of the further cell phone is to be stored or has been stored for the first time in the memory element after removal has been detected, and if this is the case, and
   automatic establishment of a short range radio connection to the further cell phone if such a connection does not yet exist, and automatic initialization of a mobile radio connection to the further cell phone.

BRIEF DESCRIPTION OF THE DRAWINGS

The invention will be explained in more detail below in the drawing using an exemplary embodiment. In said drawing.

DETAILED DESCRIPTION OF THE PREFERRED EMBODIMENTS

Figure 1:
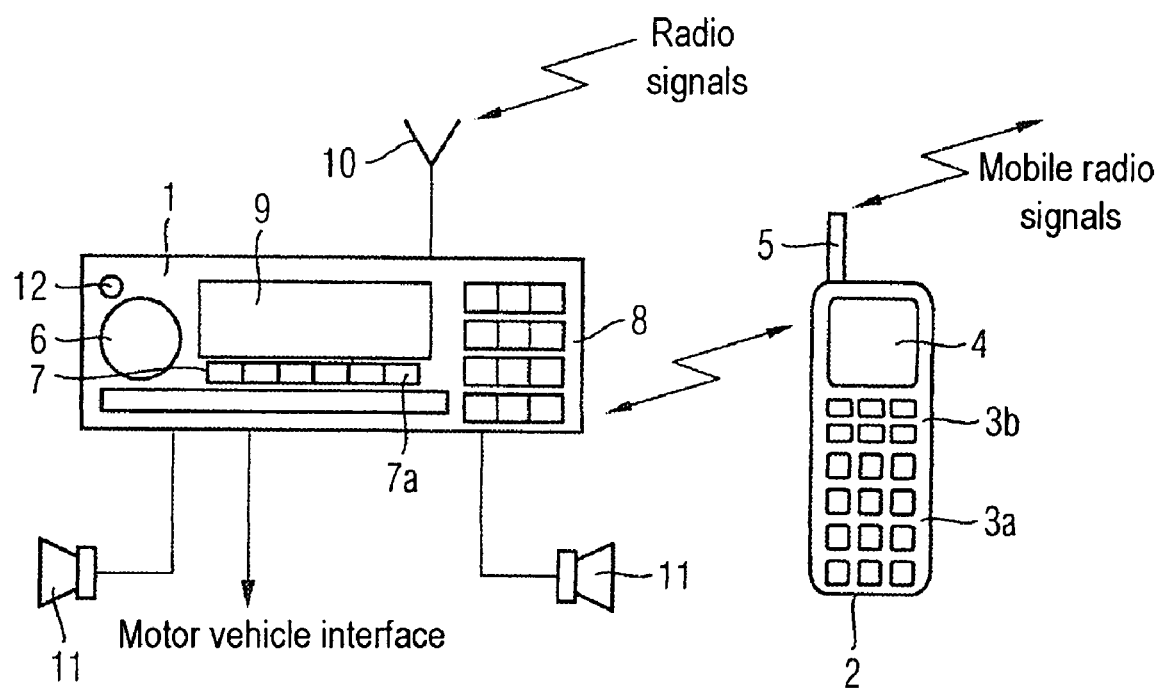
FIG. 1 is a schematic diagram showing a car radio and its coupling to a cell phone according to an embodiment of the present invention.

FIG. 1 shows an exemplary embodiment of a communication system with a radio device 1 which is embodied as a car radio, and a cell phone 2. The cell phone has, in a manner known per se, a plurality of operator controls 3 and a display unit (display) 4. The operator controls 3 are used, for example, to dial a telephone number, to accept an incoming telephone call, to call up a telephone directory etc. For example the dialed telephone number and further status information items are displayed on the display 4. Mobile radio signals are received and output via the mobile radio antenna 5.

The radio device 1 has a plurality of groups of operator controls 6, 7, 8. For example the volume of the radio device 1 can be set by means of the operator control 6. Further functions, such as for example the selection of a stored transmitter, can be carried out by means of the operator controls 7. The operator controls 8 are embodied as a numerical block and correspond to this extent to the operator controls 3a of the cell phone 2. A telephone number can thus be selected by means of the operator controls 8. The radio receiver also has a display unit (display) 9. For example the transmitter which is set and other status information are displayed on the display 9 in the radio mode. When a telephone number is dialed by means of the operator controls 8, the selected telephone number can be displayed on the display 9. When there is an incoming call, the telephone number of the calling party can also be displayed on the display 9. Instead of the display of the telephone number it is also possible to indicate the name of the calling party on the display 9 if an assignment of names and telephone numbers is stored in a memory element of the radio receiver or of the cell phone.

The radio device 1 also has a radio antenna 10 for receiving radio signals. Loudspeakers 11 are connected to the radio device 1 as acoustic output units.

Furthermore, a microphone is integrated into the radio device 1. The radio device 1 is connected to the cell phone 2 via a short range radio connection so that the radio device 1 with the microphone 12 and the loudspeakers 11 serves as a hands free unit for the cell phone 2.

An authorized cell phone is signed on with the radio device 1 so that the radio device 1 does not connect to any cell phone within its range via the short range radio connection, allowing calls to be made using any of these cell phones. In this context, an identifier of the authorized cell phone 2 is stored in a memory element of the radio device 1. Only cell phones whose identifier is stored in the radio device 1 can therefore be used together with the radio device 1.

Figure 2:
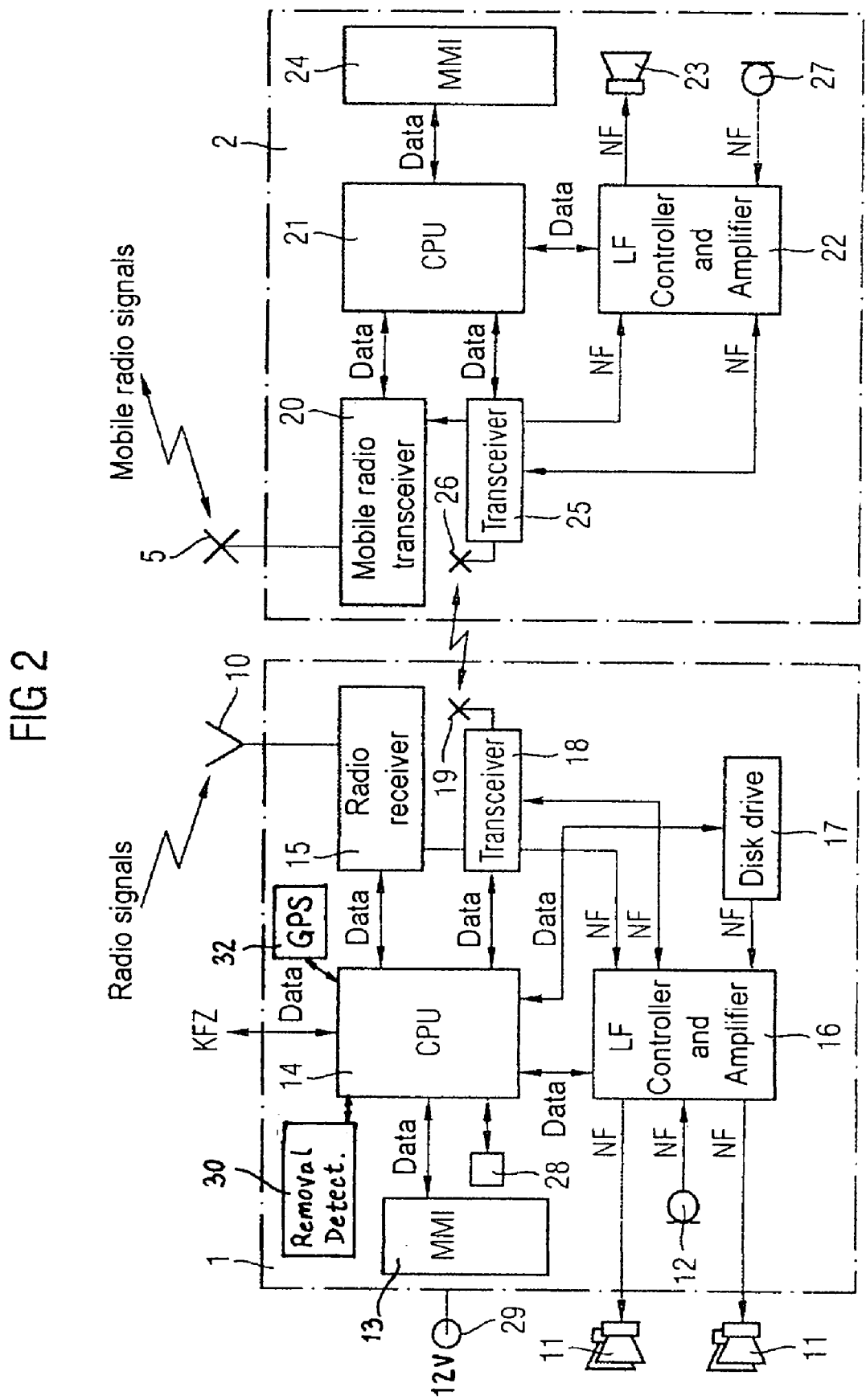
FIG. 2 is a block circuit diagram with the essential components of the car radio and of the cell phone of FIG. 1.

FIG. 2 shows a simplified block diagram of the radio device 1 and of the cell phone 2. The radio device 1 contains an operator control unit (MMI) 13 which has, for example, the operator controls 6, 7 and 8 in FIG. 1. The operator control unit 13 is connected to a microprocessor unit (CPU) 14. The CPU 14 converts the signals coming from the operator control unit 13 into control commands. In order to receive radio programs, the radio device 1 has a radio antenna 10 which is connected to a radio receiver unit 15. The radio receiver unit 15 is actuated by the CPU 14, for example to select the radio signals of a specific transmitter. The radio signals which are received via the radio antenna 10 are converted in a known fashion into low frequency (LF) signals in the radio receiver unit 15. The low frequency signals are amplified in a LF controller and amplifier 16 and fed to the loudspeakers 11 for acoustic playback. Furthermore, the radio device 1 has a disk drive 17 so that, for example, music can be played back from a CD or from a music cassette. The disk drive 17 is also actuated by the CPU 14. The low frequency signals which are output by the disk drive 17 are fed to the LF controller and amplifier 16 and then also output via the loudspeakers 11. Furthermore, a memory element 28 in which, in particular, the identifier of authorized cell phones is stored is also connected to the CPU 14.

Furthermore, the radio device 1 contains a transceiver 18 having an antenna 19 for establishing a short range radio connection to the cell phone 2. The transceiver 18 is also actuated via the CPU 14. The transceiver 18 is connected to the LF controller and amplifier 16. In this way, voice signals which are received at the antenna 19 via the short range radio connection can be passed on from the cell phone 2 to the LF controller and amplifier 16 via the transceiver 18 and output via the loudspeakers 11. Voice signals of a user are received by the microphone 12 and fed to the transceiver 18 and the antenna 19 via the LF controller and amplifier 16, and transmitted to the cell phone 2 via the short range radio connection.

The voltage supply to the radio device 1 is provided by means of an electrical connection 29 to a voltage supply system of the motor vehicle.

The cell phone 2 has a mobile radio antenna 5 which is connected to a transceiver unit 20 for mobile radio signals. The transceiver unit 20 is actuated by a CPU 21. The received mobile radio signals are converted in the transceiver unit 20 into LF signals which are fed to an LF controller and amplifier 22. In the mobile radio mode, the LF signals can be output via a loudspeaker 23 which is integrated into the cell phone 2. The voice signals of the telephone user can be fed via the microphone 27 of the cell phone 2 to the LF controller and amplifier 22 and passed on from there via the transceiver unit 20 and the mobile radio antenna 5 to a fixed mobile radio station, and finally to the other party to the call. The cell phone also has an operator control 24 for dialing a telephone number and further telephone functions. Furthermore, the cell phone has a second transceiver 25 which is connected to an antenna 26. The transceiver 25 is connected to the LF controller and amplifier 22 and is actuated by the CPU 21.

The communication system which is illustrated in FIGS. 1 and 2 can be operated as a hands free unit. For this purpose, mobile radio signals which are received via the mobile radio antenna 5 are passed on, after conversion into LF signals, to the LF controller and amplifier 22 via the transceiver unit 20, and are transmitted from said LF controller and amplifier 22 to the transceiver 25. From the transceiver 25, the LF signals are transmitted via the antenna 26 via a short range radio connection at a frequency of, for example, 2.4 gigahertz, to the antenna 19 of the radio device 1 and are output from there via the loudspeakers 11 in a previously described way. Conversely, the voice signals which are transmitted by the antenna 19 of the radio device via the short range radio connection are picked up by the antenna 26 of the cell phone 2 and passed on to the LF controller via the transceiver 25. In this context, the radio signals are converted into LF signals at their transceiver 25. The LF signals are then passed on from the LF controller 22 to the first transceiver unit 20. After the received LF signals have been converted into mobile radio signals in the transceiver unit 20, signals are finally transmitted to the fixed mobile radio station via the mobile radio antenna 5.

In the exemplary embodiment, the transceivers 18 and 25 operate using the Bluetooth method which is known per se.

To this extent, the way in which the mobile radio device is used here in combination with the cell phone is according to specifications, with the radio device serving as a hands free device.

The radio device 1 includes a removal detection module 30 for detecting removal of the radio device from a motor vehicle. In this context, the electrical connection of the electronic device to the voltage supply system of the motor vehicle is monitored. If this connection is interrupted, for example corresponding information is stored in the memory element 28. In order to ensure that this information is still stored after the supply voltage has been interrupted, for example a capacitor (not illustrated in the drawing) is provided for the brief continued operation of the CPU 14, said capacitor maintaining the voltage supply for a brief time. An interruption in the voltage supply can also be detected in the same way as it is in the case of car radios which are protected by a code. The removal detection module 30 may alternatively or additionally include a mechanical switch that is actuated upon removal of the electronic device from the motor vehicle.

The means which are also provided according to the invention for automatically establishing a short range radio connection to a further cell phone and for automatically initializing a mobile radio connection to the further cell phone when an identifier of the second cell phone is to be stored or has been stored for the first time in the memory element 28 after re-activation of the electronic device after removal has been detected are embodied as a computer program and are a component of the firmware of the radio device.

Figure 3:
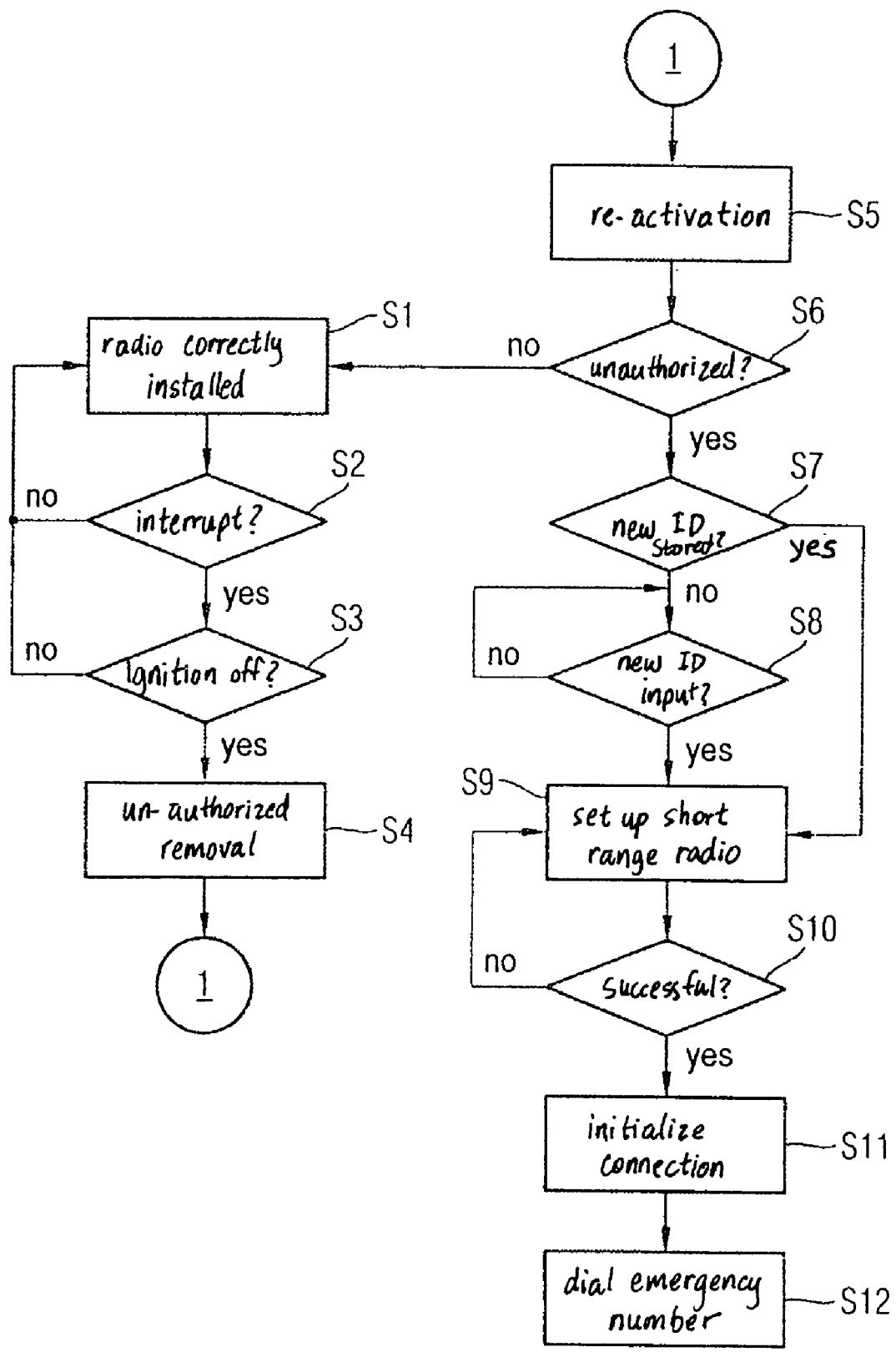
FIG. 3 is a flowchart of a method sequence according to an embodiment of the present invention.

The radio device 1 according to the invention therefore provides the possibility of detecting removal of the radio device 1 from the vehicle, for example the disconnection of the voltage supply. If the radio device 1 is re-activated after removal which is detected in this way, the device can be used as a radio receiver. Alternatively, it may also be necessary to input a code in a conventional way for this function. However, the radio device 1 according to the invention also facilitates its retrieval after theft. If the radio device is in fact to be used as a hands free device together with a further cell phone, it is necessary to store an identifier of the further cell phone in the memory element 28 of the radio device 1. If such a registration process is performed, which process can either take place manually at the radio device 1 or by transmitting the identifier via the short range radio connection, a short range radio connection is established from the radio device 1, if it has not already occurred, to the further cell phone and in addition automatic initialization of a mobile radio connection to the further cell phone is subsequently carried out. By means of this automatically generated mobile radio connection it is then possible for data which facilitates the retrieval of the radio device 1 to be transmitted either to a central location or to the owner of the device. The method will be explained in more detail using the flowchart from FIG. 3.

In step S1 it is assumed that the radio device is correctly installed and used in a motor vehicle of the owner. The radio device is connected to the voltage supply, and the identifiers of one or more authorized cell phones which can use the radio device as a hands free device are stored in the memory 28. Furthermore, an emergency call number is stored in the memory element 28. In step S2 an interrogation as to whether the voltage supply of the radio device is interrupted is carried out. If this is not the case, the loop with the steps S1 and S2 is run through continuously. In contrast, if it is ascertained in step S2 that the voltage supply has been interrupted, in step S2 checking is carried out to determine whether the ignition of the motor vehicle has already been switched off for longer than, for example, 2 minutes. If the ignition was switched off not longer than 2 minutes ago, the disconnection of the voltage supply from the radio device is not evaluated as unauthorized removal, that is to say theft. In this way the radio device can, for example, be removed within the aforesaid time period for servicing purposes without the protection mechanism becoming effective. If, in contrast, it is ascertained in step S3 that the ignition has also already been switched off for longer than 2 minutes, this is considered to be an un-authorized removal of the radio device and corresponding information is stored in the memory element 28, step S4.

After re-activation of the radio device in step S5, in step S6 checking is carried out to determine whether unauthorized removal of the radio device has previously been detected, that is to say whether the corresponding information is stored in the memory element 28. If this is not the case, the radio device can be operated normally.

If, in contrast, it is ascertained in step 6 that unauthorized removal of the radio device has been detected, in step S7 checking is carried out to determine whether a new identifier of a further cell phone has been stored in the memory element 28 since the removal of the device was detected.

If this is the case, in step S9 a short range radio connection is set up to the further cell phone if such a connection does not already exist. In step S10 it is checked whether the setting up of the short range radio connection was successful. If this is not the case, the loops with the steps S9 and S10 are run through until a successful connection setup has been carried out, for which purpose the further cell phone has to be at least in the range of the short range radio connection. If in step S10 it is ascertained that a short range radio connection has been set up to the further cell phone whose identifier has first been input after the removal was detected, a mobile radio connection to the further cell phone is subsequently initialized in step S11. In this context, the emergency call number which is stored in the memory element 28 is dialed in step S2. Information about the further connected cell phone which presumably relates to the assumed thief of radio device is then transmitted from the radio device to the selected call number, either by SMS or as a voice message. The information here may either be, in particular, an identifier of the further cell phone, in particular its call number. The associated mobile radio subscriber can then be determined by means of the transmitted call number using the mobile radio service provider, and measures for recovering the radio device can be set in train.

By means of the mobile radio connection it is also possible to transmit further information, such as in particular a position data item, if the radio device is equipped with a module 32 (see FIG. 2) for determining the position, for example a GPS module. This can facilitate access to the stolen radio device.

In the described method, whenever the radio device is reactivated after removal has been detected an attempt is made to set up a mobile radio connection via a cell phone which has been signed on for the first time to the radio device after the removal.

If in step S7 it is ascertained that after the detected removal and re-activation of the radio device a new identifier of a further cell phone has not been stored yet, in step S8 it is checked whether a new identifier of a further cell phone is currently input. The interrogation in step S8 is carried out continuously and whenever the signing on of a new cell phone is started by means of a corresponding instruction. If it is detected in step S8 that a new identifier of a further cell phone is to be input, the short range radio connection and the mobile radio connection are, as described above, set up in steps S9 to S12 and the information is transmitted, as previously stated.

The invention has been described with reference to a radio device but it can also be applied for other electronic devices for motor vehicles such as, in particular, a navigation system or a road toll device.

What is claimed is:

1. An electronic device for installation in a motor vehicle, comprising:
   a radio module configured to establish a short range radio connection to an authorized cell phone;
   a memory element storing an identifier identifying the authorized cell phone;
   a removal detecting module detecting removal of the electronic device from the motor vehicle, wherein the radio module is configured to establish a short range radio connection to a further cell phone when an identifier of the further cell phone is to be stored or is stored for the first time in the memory device after a reactivation of the electronic device subsequent to the detection of a removal by the removal detecting device; and
   a mobile radio connection module configured to automatically initialize a mobile radio connection with the further cell phone when an identifier of the further cell phone is to be stored or is stored for the first time in the memory device after a reactivation of the electronic device subsequent to the detection of a removal by the removal detecting device;
   wherein the memory element or a further memory device stores a telephone number that is dialed or connected to when the mobile radio connection is automatically initialized with the further cell phone such that a service center or owner of the electronic device is informed about re-activation of the electronic device.

2. The electronic device of claim 1, wherein the memory element or the further memory device is a protected memory element.

3. The electronic device of claim 1, wherein the identifier of the further cell phone is transmitted by the automatically initialized mobile radio connection.

4. The electronic device of claim 1, wherein the removal detecting module monitors a connection of the electronic device to a voltage supply such that an interruption of the voltage supply is determined to be a removal of the electronic device.

5. The electronic device of claim 4, wherein the removal detecting module is further configured to evaluate a time period between switching off an ignition of the motor vehicle and the interruption of the voltage supply.

6. The electronic device of claim 1, wherein the removal detecting module includes a mechanically activated switch.

7. The electronic device of claim 1, further comprising a positioning determining module determining a position of the electronic device, the determined position being transmitted using the automatically initialized mobile radio connection.

8. The electronic device of claim 1, wherein the short range radio connection has a range of not more than 100 m.

9. The electronic device of claim 8, wherein the short range radio connection has a range of not more than 10 m.

10. The electronic device of claim 1, wherein the short range connection is a bidirectional short range radio connection.

11. The electronic device of claim 1, wherein the short range connection is a Bluetooth connection.

12. The electronic device of claim 1, wherein the electronic device is one of a car radio, navigation device, multimedia device, or a road toll device.

13. The electronic device of claim 1, wherein the electronic device is one of a hands free device or a component of a hands free device.

14. A method of operating an antitheft apparatus of an electronic device of a motor vehicle, the electronic device having a radio module for establishing a short range radio connection to an authorized cell phone and a memory element storing an identifier of the authorized cell phone, the method comprising the steps of:
   detecting removal of the electronic device from the motor vehicle;
   determining whether the electronic device is activated after detecting the removal of the electronic device;

determining whether an identifier of a further cell phone is to be stored or has been stored for the first time in the memory element after detecting the removal; and if it is determined that the identifier of the further cell phone is to be stored or has been stored for the first time in the memory element after detecting the removal, then automatically establishing a short range radio connection to the further cell phone and automatically initializing a mobile radio connection with the further cell phone, said initializing the mobile radio connection with the further cell phone including automatically initializing the mobile radio connection to a predefined telephone number.

15. The method of claim 14, wherein an identifier of the further cell phone is transmitted using the automatically initialized mobile radio connection.

16. The method of claim 14, further comprising the step of determining a position of the electronic device and transmitting this position using the automatically initialized mobile radio connection.

* * * * *